United States Patent [19]

Garner et al.

[11] Patent Number: 5,620,200
[45] Date of Patent: Apr. 15, 1997

[54] AIRBAG MODULE REACTION CANISTER ENDWALL WITH AIRBAG INFLATOR MOUNT

[75] Inventors: Brett R. Garner, South Weber; Rick L. Halford, Layton; Alan L. Clark, Kaysville; Michael D. Jones, Hooper, all of Utah

[73] Assignee: Morton International, Inc., Chicago, Ill.

[21] Appl. No.: 550,674

[22] Filed: Oct. 31, 1995

[51] Int. Cl.$^6$ ................................................. B60R 21/16
[52] U.S. Cl. ............................................................ 280/728.2
[58] Field of Search ................................. 280/728.2, 736; 251/149.6; 422/166; 128/207.14

[56] References Cited

U.S. PATENT DOCUMENTS

| | | | |
|---|---|---|---|
| 3,795,413 | 3/1974 | Usui et al. | 280/150 AB |
| 3,834,729 | 9/1974 | Oka et al. | 280/150 AB |
| 4,370,930 | 2/1983 | Strasser et al. | 102/530 |
| 4,907,819 | 3/1990 | Cuevas | 280/736 |
| 4,936,544 | 6/1990 | Bartholomew | 251/149.6 |
| 5,033,772 | 7/1991 | Frantom et al. | 280/737 |
| 5,069,480 | 12/1991 | Good | 280/743 |
| 5,260,038 | 11/1993 | Decker et al. | 422/305 |
| 5,285,776 | 2/1994 | Bertram | 128/207.14 |
| 5,360,232 | 11/1994 | Lowe et al. | 280/741 |
| 5,405,164 | 4/1995 | Paxton et al. | 280/728 A |
| 5,433,472 | 7/1995 | Green et al. | 280/728.2 |
| 5,441,705 | 8/1995 | Lauritzen | 422/166 |
| 5,449,195 | 9/1995 | Garner | 280/728.2 |
| 5,454,587 | 10/1995 | Halford et al. | 280/728.1 |
| 5,456,489 | 10/1995 | Rose et al. | 280/728.2 |
| 5,458,363 | 10/1995 | Garner et al. | 280/728.1 |
| 5,458,364 | 10/1995 | Muller et al. | 280/728.2 |
| 5,487,556 | 1/1996 | Jenkins et al. | 280/728.2 |
| 5,498,025 | 3/1996 | Easter et al. | 280/728.2 |

*Primary Examiner*—Eric D. Culbreth
*Assistant Examiner*—Jonathan E. Butts
*Attorney, Agent, or Firm*—George W. Rauchfuss, Jr.; Gerald K. White

[57] ABSTRACT

A canister endwall for use as part of a reaction canister of an airbag module for securing an airbag inflator. The airbag inflator has a cylindrical inflator sidewall of a predetermined diameter that ends in a tapered portion of the inflator sidewall that tapers radially inwardly to one end of the airbag inflator having an inflator flange. The inflator flange extends radially outwardly from the tapered portion of the inflator sidewall but has a diameter that is smaller than the diameter of the inflator sidewall. The canister endwall has an inner edge defining an airbag inflator mounting hole and a truncated conical array of a plurality of resilient fingers extending from the inner edge. The inner edge of the canister endwall is sized and shaped to allow passage of the inflator flange of the airbag inflator and engage the tapered portion of the inflator sidewall in a substantially gas-tight manner, and the truncated conical array of the plurality of resilient fingers is sized to butt against the inflator flange when the tapered portion of the inflator sidewall is engaged with the inner edge. The plurality of resilient fingers are bendable to allow passage of the inflator flange and, once the inflator flange passes through the truncated conical array of the plurality of resilient fingers, to spring back and butt against the inflator flange to prevent the inflator flange from being pulled out of the airbag inflator mounting hole.

15 Claims, 5 Drawing Sheets

AIRBAG MODULE REACTION CANISTER ENDWALL WITH AIRBAG INFLATOR MOUNT

FIELD OF THE INVENTION

The present invention relates to an airbag module assembly and, more particularly, to a canister endwall having an airbag inflator mount for mounting an airbag inflator within a reaction canister of a passenger side airbag module.

BACKGROUND OF THE INVENTION

Airbag modules are part of inflatable restraint systems that are employed in automobiles for protecting an occupant against injury by physically restraining the occupant's body when the automobile encounters a collision. A passenger side airbag module, which is mounted in the dashboard of an automobile, normally includes a reaction canister housing an airbag cushion and an airbag inflator which is mounted between two canister endwalls or endplates of the reaction canister.

The airbag inflator has an elongated cylindrical housing defining gas exhaust ports and containing gas generant that, once triggered by a remote collision sensor, provides the inflation gas for inflating the airbag cushion. A hybrid inflator has gas exhaust ports located at one end while pyrotechnic inflators have thrust-neutral gas exhaust ports distributed substantially along their entire length.

A hybrid airbag inflator is normally secured in the reaction canister with a flange or attachment at one end and fasteners such as a nut and threaded stud, the stud being welded to the other end of the inflator. The inflator flange or attachment and the fastener engage opposite endplates of the reaction canister to secure the inflator therein. The use of fasteners to mount the airbag inflator, however, imposes structural limitations on the inflator and adds additional parts to the airbag module. In addition, the use of fasteners is not conducive to automated assembly, makes the airbag modules difficult to assembly and is a major cause of reworking airbag modules due to the necessity of replacing broken or unsecured fasteners. Furthermore, reworking of the airbag modules is not always possible and the defective airbag module must be discarded, resulting in lost production and increased manufacturing costs.

The canister endwalls, which the airbag inflator is mounted to, may be integral with a deep drawn steel reaction canister or may comprise endplates made of steel and secured to an extruded aluminum reaction canister or fabricated reaction canister. If the canister endplates are separate from and secured to the reaction canister, the airbag inflator is preferably secured to the canister endplates so that it can withstand a substantial tensional load to assist in holding the canister endplates to the reaction canister during inflation of the airbag cushion. As with all components used in automobiles, the airbag inflator should also be mounted in a squeak and rattle-free manner. In addition, the canister should be sealed in a substantially gas-tight manner so that most, and preferably all, of the inflation gas produced by the airbag inflator can be directed into the airbag cushion.

Accordingly, there is a need for quick and easy, snap-in, fastenerless, substantially gas-tight, shake and rattle free airbag inflator mount for mounting an airbag inflator within a reaction canister of an airbag module that is conducive to automated assembly. The airbag inflator mount should also allow a substantial tensional load to be applied to the airbag inflator, whereby the inflator can assist in holding non-unitary canister endplates secured to the reaction canister during inflation of the airbag cushion.

SUMMARY OF THE INVENTION

The present invention is directed to an airbag inflator mount for mounting an airbag inflator that satisfies one or more of the above needs. In carrying out this invention, there is provided a canister endwall having an airbag inflator mount for securing an airbag inflator within a reaction canister of an airbag module.

The airbag inflator has a cylindrical inflator sidewall of a predetermined diameter that ends in a tapered portion of the inflator sidewall that tapers radially inwardly to a first end of the airbag inflator having an inflator flange. The inflator flange extends radially outwardly from the tapered portion of the inflator sidewall and has a diameter that is smaller than the diameter of the inflator sidewall. The canister endwall has an inner edge defining an airbag inflator mounting hole, and a truncated conical array of a plurality of resilient fingers extending from the inner edge. The inner edge of the canister endwall is sized and shaped to allow passage of the inflator flange of the airbag inflator and engage the tapered portion of the inflator sidewall in a substantially gas-tight manner. Also, the truncated conical array of the plurality of resilient fingers is sized to butt against the inflator flange when the tapered portion of the inflator sidewall is engaged with the inner marginal edge, to prevent the inflator flange from being pulled out of the airbag inflator mounting hole.

The plurality of resilient fingers are bendable to allow passage of the inflator flange and, once the inflator flange is passed the truncated conical array of the plurality of resilient fingers, to spring back to butt against the inflator flange.

According to one aspect of the present invention, the canister endwall comprises a canister first endwall that is provided as part of an airbag module reaction canister for housing the airbag inflator. The airbag inflator further includes a second end having a flat head extending radially outwardly from the airbag inflator. The reaction canister also has a trough-shaped canister body having two opposed ends, with the canister first endwall secured to one of the two opposed ends.

The reaction canister further includes a canister second endwall secured to the other of the two opposed ends of the canister body. The canister second endwall has an inner marginal edge defining a generally circular airbag inflator receiving hole. The inner marginal edge is sized and shaped to allow passage of the first end and inflator sidewall of the airbag inflator and engage the flat head in a substantially gas-tight manner. The canister second endwall is resiliently deformable axially inwardly to allow the inflator flange of the airbag inflator to pass through and be engaged by the truncated conical array of the plurality of resilient fingers of the canister first endwall, and to spring axially back to secure the airbag inflator in tension between the canister endwalls.

According to a further aspect of the present invention, the reaction canister is included as part of an airbag module also including the airbag inflator, a diffuser shelf and a folded airbag. The diffuser shelf defines at least one gas diffusing opening and is secured within the reaction canister between an open top of the reaction canister and the airbag inflator. The folded airbag cushion is mounted within the reaction canister above the diffuser shelf and has an open mouth positioned over the at least one gas diffusing opening defined by the diffuser shelf.

According to another aspect of the present invention, the canister first and second endwalls are unitary with the trough-shaped canister body. According to an additional aspect of the present invention, the two opposed ends of the trough-shaped canister body are open. The canister second endwall comprises a canister second endplate secured to the canister body closing one of the two opposed open ends, and the canister first endwall comprises a canister first endplate secured to the canister body closing the other of the two opposed open ends.

According to yet another aspect of the present invention, the canister second endplate does not have an inner marginal edge defining a generally circular airbag inflator receiving hole and the airbag inflator does not have a flat head at the second end thereof. Instead, the second end of the airbag inflator and the canister second endplate are welded together.

The present invention, accordingly, provides a quick and easy, snap-in, fastenerless, substantially gas-tight, shake and rattle free airbag inflator mount for mounting an airbag inflator within a reaction canister of an airbag module that is conducive to automated assembly. The airbag inflator mount provided by the present invention for mounting an airbag inflator within a reaction canister also allows a substantial tensional load to be applied to the inflator, whereby the inflator can assist in holding non-unitary canister endplates secured to the trough-shaped body of the reaction canister during inflation of the airbag cushion.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
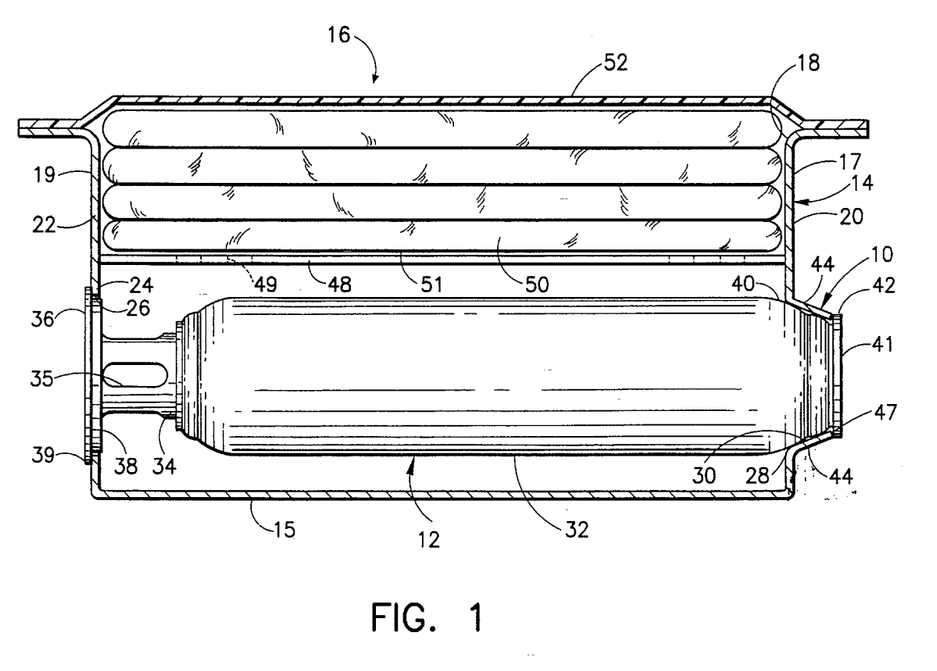
FIG. 1 is a side elevation view, partially in section, of an airbag module including a reaction canister according to the present invention.
Figure 2:
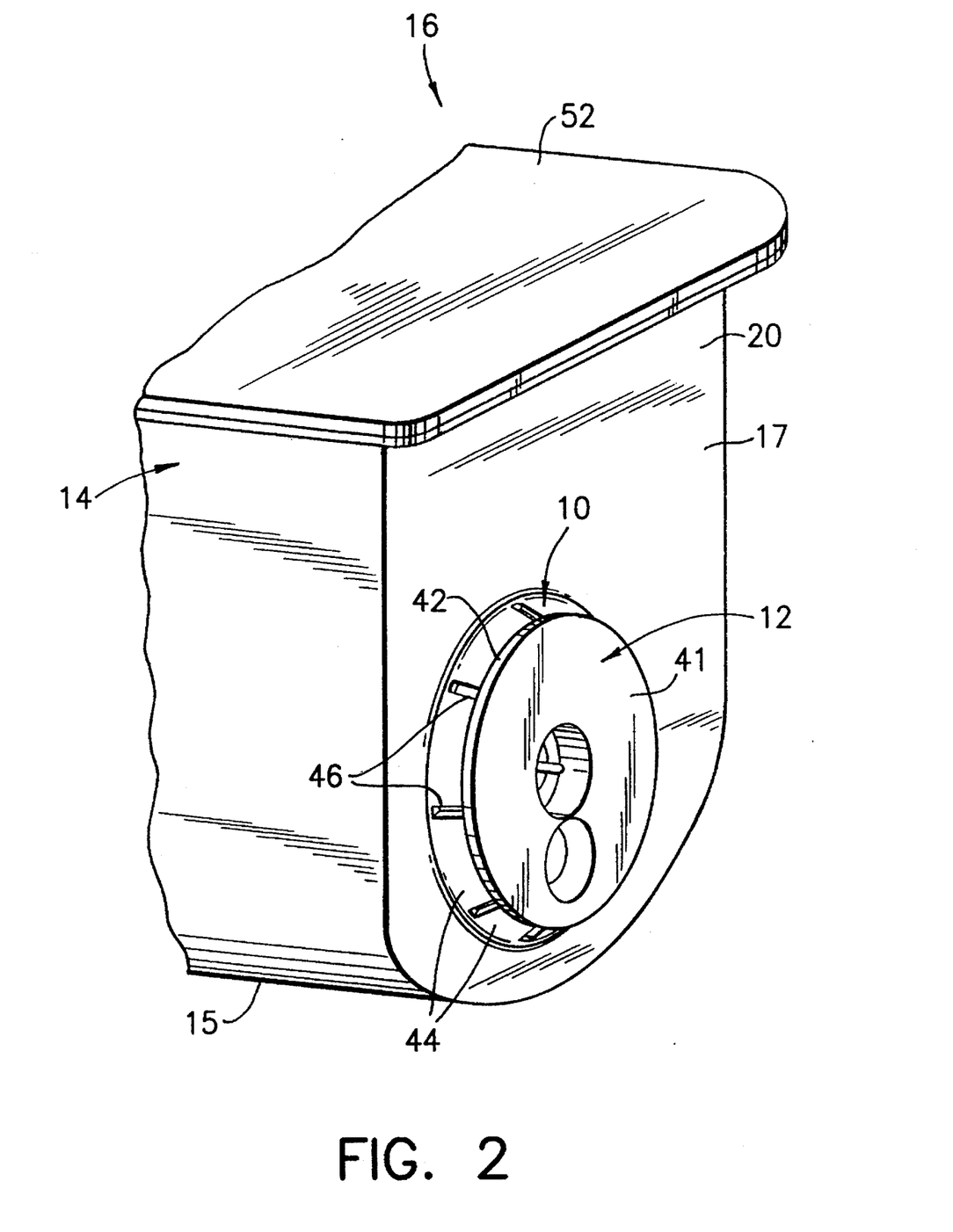
FIG. 2 is a perspective view of a portion of the airbag module assembly of FIG. 1.
Figure 3:
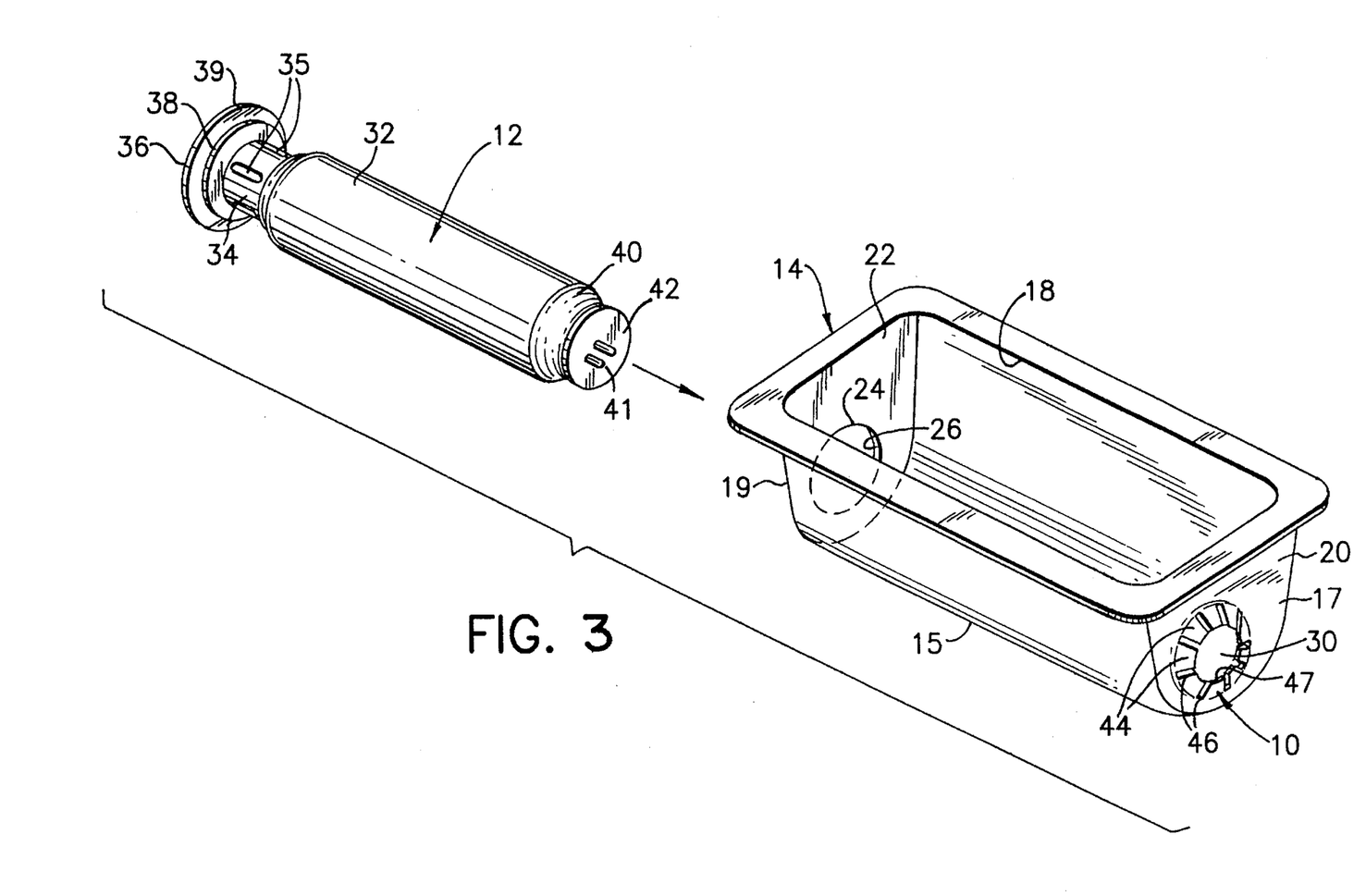
FIG. 3 is an exploded perspective view of a hybrid airbag inflator and a reaction canister of the airbag module assembly of FIGS. 1 and 2.

Referring to FIGS. 1 through 3, the present invention is directed to a canister first endwall 20 having an airbag inflator mount comprising a truncated conical array 10 of a plurality of resilient fingers 44 for mounting an airbag inflator 12 within a reaction canister 14 of an airbag module 16. The reaction canister 14 can be made of steel or another suitable material, and is produced by being deep drawn, for example. The reaction canister 14 includes a trough-shaped canister body 15 having two opposed ends 17,19, the canister first endwall 20 at one opposed end 17 and a canister second endwall 22 at the other opposed end 19. The canister endwalls 20,22 are unitary with the canister body 15 and with the canister body 15 define an open top 18 of the reaction canister 14. The canister second endwall 22 has an inner marginal edge 24 defining a generally circular airbag inflator receiving hole 26, and the canister first endwall 20 has an inner edge 28 defining a generally circular airbag inflator mounting hole 30.

The airbag inflator 12 has a cylindrical inflator sidewall 32 of a predetermined diameter terminating in a neck 34 defining a plurality of gas exhaust ports 35. As shown, the airbag inflator 12 is a hybrid type of inflator having the gas exhaust ports 35 located at one end thereof. The neck 34 leads to a second end 36 of the airbag inflator 12 having a flat head 38 extending through the airbag inflator receiving hole 26 of the canister second endwall 22. The flat head 38 has a lip 39 that extends radially outwardly from the airbag inflator 12 and engages the inner marginal edge 24 of the canister second endwall 22 in a substantially gas-tight manner. The cylindrical inflator sidewall 32 of the airbag inflator 12 terminates opposite the neck 34 in a tapered portion 40 of the inflator sidewall 32 that extends through the airbag inflator mounting hole 30 in the canister first endwall 20 and engages the inner edge 28 of the canister first endwall 20 in a substantially gas-tight manner. The tapered portion 40 of the inflator sidewall 32 tapers radially inwardly to a first end 41 of the airbag inflator 12 having an inflator flange 42 that extends radially outwardly from the tapered portion 40 of the inflator sidewall 32 and has a diameter that is smaller than the diameter of the cylindrical inflator sidewall 32.

The truncated conical array 10 of the plurality of resilient fingers 44 extends radially inwardly from the inner edge 28 and traversely outwardly from the canister first endwall 20. As shown, the truncated conical array 10 resembles a truncated cone extending out of the canister first endwall 20. The plurality of resilient fingers 44 are closely divided by a plurality of slits 46 which ideally need only be just wide enough to allow the plurality of resilient fingers 44 to bend, yet are substantially gas-tight. For purposes of illustration, the slits 46 are shown wider than they generally are. The truncated conical array 10 forms an outer opening 47 that is smaller in diameter than the inflator flange so that the plurality of resilient fingers 44 butt against the inflator flange 42.

The airbag module 16 further includes a diffuser shelf 48, a folded airbag cushion 50 and an airbag module cover 52. The diffuser shelf 48 defines a plurality of gas diffusing openings 49 and is secured within the reaction canister 14 between the open top 18 and the airbag inflator 12. The folded airbag cushion 50 is mounted within the reaction canister 14 above the diffuser shelf 48 and has an open mouth 51 positioned over the plurality of gas diffusing openings 49 defined by the diffuser shelf 48. The airbag module cover 52 closes the open top 8 of the reaction canister 14 to conceal and protect the contents of the reaction canister 14.

During assembly, the inflator flange 42 of the airbag inflator 12 is inserted through the airbag inflator receiving hole 26 defined by the inner marginal edge 24 of the canister second endwall 22, through the trough-shaped canister body 15 and through the airbag inflator mounting hole 30 defined by the inner edge 28 of the canister first endwall 20. The inner edge 28 of the canister first endwall 20 is sized and shaped to allow passage of the inflator flange 42 of the airbag inflator 12 and engage the tapered portion 40 of the cylindrical inflator sidewall 32 in a substantially gas-tight manner. The plurality of resilient fingers 44 in the truncated conical array 10 are bendable to allow passage of the inflator flange 42 of the airbag inflator 2 and, once the inflator flange 42 passes through the truncated conical array to spring back to butt against the inflator flange 42 to prevent the inflator flange 42 from being pulled out of the airbag inflator mounting hole 30.

The inner marginal edge 24 of the canister second endwall 22 is sized and shaped to allow passage of the first end 4 and the cylindrical inflator sidewall 32 of the airbag inflator 12 and engage the lip 39 of the flat head 38 of the airbag inflator 12 in a substantially gas-tight manner. The canister second endwall 22 is resiliently deformable slightly into the reaction canister 14 to allow the inflator flange 42 of the airbag inflator 12 to pass through and be engaged by the truncated conical array 10 of the plurality of resilient fingers 44, and to spring back to hold the airbag inflator 12 in tension between the canister endwalls 20,22.

Figure 4:
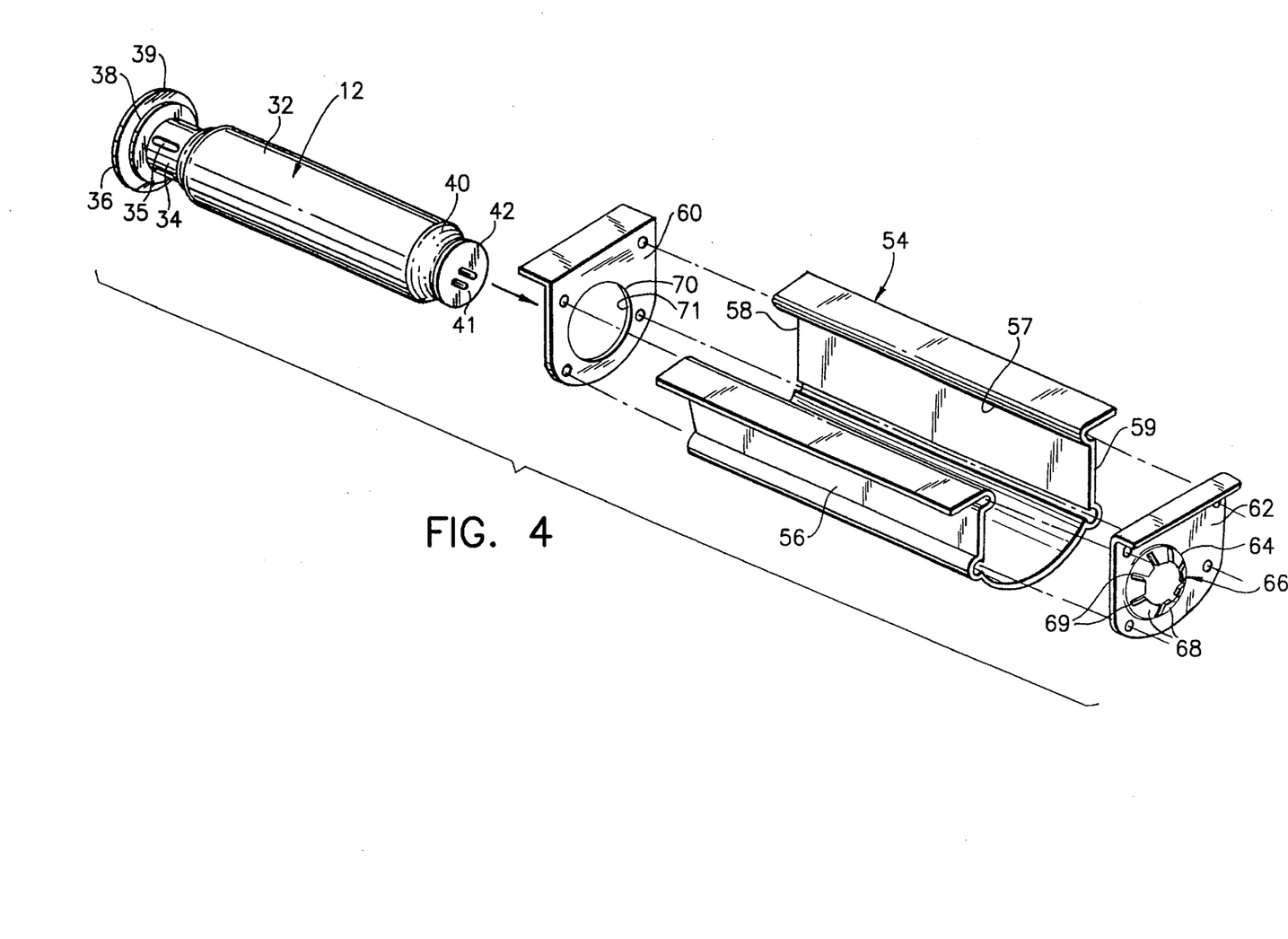
FIG. 4 is an exploded perspective view of a hybrid inflator and another reaction canister according to the present invention.

Referring to FIG. 4, another reaction canister 54 according to the present invention is shown. The reaction canister 54 comprises a trough-shaped canister body 56 defining two opposed open ends 58, 59. A canister first endwall comprises a canister first endplate 62 secured to the canister body 56 closing one open end 59, and a canister second endwall comprises a canister second endplate 60 secured to the canister body 56 closing the other open end 58. The trough-shaped canister body 56 of the reaction canister 54 can be made of aluminum or another suitable material and is produced, for example, by being extruded, while the canister endplates 60, 62 can be made of steel or another suitable material.

The reaction canister 54 is similar to the reaction canister 4 of FIGS. 1–3 except that the endplates 60, 62 are not unitary with the canister body 56. The canister first endplate 62 has an inner edge 64 defining a generally circular airbag inflator mounting hole 65. The inner edge 64 of the canister first endplate 62 is sized and shaped to allow passage of the inflator flange 42 of the airbag inflator 12 and engage the tapered portion 40 of the cylindrical inflator sidewall 32 of the airbag inflator 12 in a substantially gas-tight manner. A truncated conical array 66 of a plurality of resilient fingers 68 extends from the inner edge 64 of the canister first endplate 62, and is sized to butt against the inflator flange 42 of the airbag inflator 12. The plurality of resilient fingers 68 are divided by a plurality of slits 69, and are bendable to allow passage of the inflator flange 42 of the airbag inflator 12. Once the inflator flange 42 passes through the truncated conical array 66 of the plurality of resilient fingers 68, the plurality of resilient fingers 68 springs back to butt against the inflator flange 42 to prevent the inflator flange 42 from being pulled out of the airbag inflator mounting hole 65.

The canister second endplate 60 has an inner marginal edge 70 defining a generally circular airbag inflator receiving hole 71. The inner marginal edge 70 is sized and shaped to allow passage of the first end 4 and the cylindrical inflator sidewall 32 of the airbag inflator 12 and engage the lip 39 of the flat head 38 of the airbag inflator 12 in a substantially gas-tight manner. The canister second endplate 60 is resiliently deformable slightly into the reaction canister 54 to allow the inflator flange 42 of the airbag inflator 12 to pass through and be engaged by the truncated conical array 66 of the plurality of resilient fingers 68, and spring back to secure the airbag inflator 2 in tension between the canister endplates 60, 62. The canister endplates 60, 62 are secured to the canister body 56 of the reaction canister 54 with fasteners such as screws, for example, prior to insertion of the airbag inflator 12. The canister body 56 and canister endplates 60, 62 define an open top 57 of the reaction canister 54.

Figure 5:
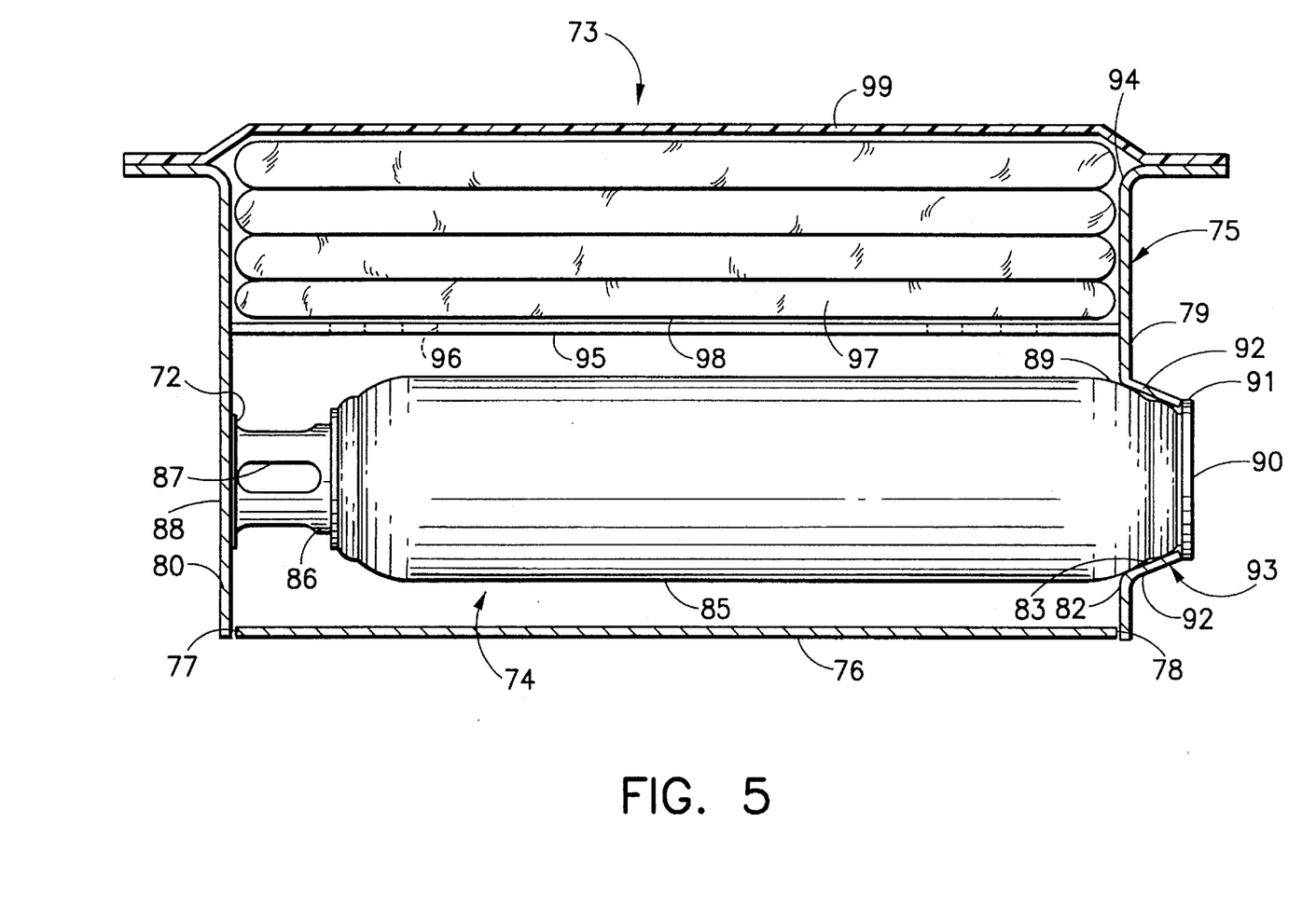
FIG. 5 is a side elevation view, partially in section, of another airbag module including a reaction canister according to the present invention.

Referring to FIG. 5, an airbag module 73 including an airbag inflator 74 mounted within another reaction canister 75 according to the present invention is shown. The reaction canister 75 comprises a trough-shaped canister body 76 defining two opposed open ends 77, 78. A canister first endwall comprises a canister second endplate 79 secured to the canister body 76 closing one open end 78, and a canister second endwall comprises a canister second endplate 80 secured to the canister body 76 closing the other open end 77. The canister first endplate 79 has an inner edge 82 defining a generally circular airbag inflator mounting hole 83.

The airbag inflator 74 has a cylindrical inflator sidewall 85 of a predetermined diameter terminating in a neck 86 defining a plurality of gas exhaust ports 87. The neck 86 leads to a second end 88 of the airbag inflator 74 that is secured to the canister second endplate 80 with a weld 72. The cylindrical inflator sidewall 85 terminates opposite the neck 86 in a tapered portion 89 of the cylindrical inflator sidewall 85 that extends through the airbag inflator mounting hole 83 in the canister first endplate 79 and engages the inner edge 82 of the canister first endplate 79 in a substantially gas-tight manner. The tapered portion 89 of the cylindrical inflator sidewall 85 tapers radially inwardly to a first end 90 of the airbag inflator 74 having an inflator flange 91 that extends radially outwardly from the tapered portion 89 of the inflator sidewall 85 and has a diameter that is smaller than the diameter of the cylindrical inflator sidewall 85.

A truncated conical array 93 of a plurality of resilient fingers 92 closely divided by a plurality of slits (hidden in FIG. 5, but similar to the slits 46 of FIG. 2) extends radially inwardly from the inner edge 82 of the canister first endplate 79 and butts against the inflator flange 91 to prevent the inflator flange 91 from being pulled out of the airbag inflator mounting hole 83.

The airbag module further includes a diffuser shelf 95, a folded airbag 97 and an airbag module cover 99. The diffuser shelf 95 defines a plurality of gas diffusing openings 96 and is secured within the reaction canister 75 between an open top 94 of the reaction canister 75 and the airbag inflator 74. The folded airbag cushion 97 is mounted within the reaction canister 75 above the diffuser shelf 95 and has an open mouth 98 positioned over the plurality of gas diffusing openings 96 defined by the diffuser shelf 95. The airbag module cover 99 closes the open top 94 of the reaction canister 75 to conceal and protect the contents of the folded airbag cushion 97.

During assembly, the canister first endplate 79 is secured to the trough-shaped canister body 76 of the reaction canister 75 with suitable fasteners, such as screws for example, and the canister second endplate 80 is welded 72 to the second end 88 of the airbag inflator. The inflator flange 91 of the airbag inflator 74 is then inserted through the canister body 76 and through the airbag inflator mounting hole 83 of the canister first endplate 79. The inner edge 82 of the canister first endplate 79 is sized and shaped to allow passage of the inflator flange 91 and engage the tapered portion 89 of the cylindrical inflator sidewall 85 in a substantially gas-tight manner. The plurality of resilient fingers 92 in the truncated conical array 93 are bendable to allow passage of the inflator flange 91 and, once the inflator flange 91 passes through the truncated conical array 93, spring back to butt against the inflator flange 91.

The canister second endplate 80 is resiliently deformable slightly into the reaction canister 75 to allow the inflator flange 91 of the airbag inflator 74 to pass through and be engaged by the plurality of resilient fingers 92, then spring back to hold the airbag inflator 74 in tension between the canister endplates 80, 79. Once the airbag inflator 74 is mounted between the canister endplates 80, 79, the canister second endplate 80 is secured to the canister body 76 of the reaction canister 75 with suitable fasteners, such as screws for example.

The present invention, accordingly, provides a quick and easy, snap-in, fastenerless, substantially gas-tight, shake and rattle free airbag inflator mount for mounting an airbag inflator within a reaction canister of an airbag module that is conducive to automated assembly. The airbag inflator mount also allows a substantial tensional load to be applied to the airbag inflator, whereby the inflator can assist in holding non-integral canister endplates secured to the trough-shaped body of the reaction canister during inflation of the airbag cushion.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A canister endwall for use as part of a reaction canister of an airbag module for securing an airbag inflator having a cylindrical inflator sidewall of a predetermined diameter and ending in a tapered portion of the inflator sidewall tapering radially inwardly to one end of the airbag inflator having an inflator flange, the inflator flange extending radially outwardly from the tapered portion of the inflator sidewall and having a diameter that is smaller than the diameter of the inflator sidewall, the canister endwall having an inner edge defining an airbag inflator mounting hole and a truncated conical array of a plurality of resilient fingers extending from the inner edge, the inner edge of the canister endwall being sized and shaped to allow passage of the inflator flange of the airbag inflator and engage the tapered portion of the inflator sidewall in a substantially gas-tight manner, the truncated conical array of the plurality of resilient fingers being sized to butt against the inflator flange when the tapered portion of the inflator sidewall is engaged with the inner marginal edge, the plurality of resilient fingers being bendable to allow passage of the inflator flange and, once the inflator flange passes through the truncated conical array of the plurality of resilient fingers, to spring back to butt against the inflator flange to prevent the inflator flange from being pulled out of the airbag inflator mounting hole.

2. An airbag module reaction canister for housing an airbag inflator having a cylindrical inflator sidewall of a predetermined diameter ending in a tapered portion of the inflator sidewall tapering radially inwardly to a first end of the airbag inflator having an inflator flange, the inflator flange extending radially outwardly from the tapered portion of the inflator sidewall and having a diameter that is smaller than the diameter of the inflator sidewall, a second end of the airbag inflator having a flat head extending radially outwardly from the airbag inflator, the reaction canister comprising:

a trough-shaped canister body having two opposed ends;

a canister first endwall secured to one of the two opposed ends of the canister body and having an inner edge defining a generally circular airbag inflator mounting hole and a truncated conical array of a plurality of resilient fingers extending radially inwardly from the inner edge and traversely outwardly from the canister first endwall, the inner edge of the canister first endwall being sized and shaped to allow passage of the inflator flange of the airbag inflator and engage the tapered portion of the inflator sidewall in a substantially gas-tight manner, the truncated conical array of the plurality of resilient fingers sized to butt against the inflator flange when the tapered portion of the inflator sidewall is engaged with the inner edge, the plurality of resilient fingers being bendable to allow passage of the inflator flange and, once the inflator flange passes through the truncated conical array, to spring back to butt against the inflator flange to prevent the inflator flange from being pulled out of the airbag inflator mounting hole; and a canister second endwall secured to the other of the two opposed ends of the canister body and having an inner marginal edge defining a generally circular airbag inflator receiving hole, the inner marginal edge being sized and shaped to allow passage of the first end and the inflator sidewall of the airbag inflator and engage the flat head of the second end of the airbag inflator in a substantially gas-tight manner, the canister second endwall being resiliently deformable inwardly to allow the inflator flange of the airbag inflator to pass through and be engaged by the truncated conical array of the plurality of resilient fingers of the first canister endwall and to spring back to secure the airbag inflator in tension between the canister endwalls.

3. The airbag module reaction canister of claim 2 wherein the canister first and second endwalls are unitary with the trough-shaped canister body of the reaction canister.

4. The airbag module reaction canister of claim 3 wherein the reaction canister is a deep drawn reaction canister.

5. The airbag module reaction canister of claim 2 wherein the two opposed open ends of the trough-shaped canister body are open, the canister second endwall comprises a canister second endplate secured to the trough-shaped canister body closing one of the two opposed open ends and the canister first endwall comprises a canister first endplate secured to the trough-shaped canister body closing the other of the two opposed open ends.

6. The airbag module reaction canister of claim 5 wherein the trough-shaped body is an extruded trough-shaped body.

7. An airbag module comprising:

a reaction canister defining an open top and including a canister first endwall and a canister second endwall, the canister first endwall having an inner edge defining a generally circular airbag inflator mounting hole and a truncated conical array of a plurality of resilient fingers extending radially inwardly from the inner edge and traversely outwardly from the canister first endwall;

an airbag inflator having a cylindrical inflator sidewall of a predetermined diameter ending in a tapered portion of the inflator sidewall tapering radially inwardly to a first end of the airbag inflator having an inflator flange, the inflator flange extending radially outwardly from the tapered portion of the inflator sidewall and having a diameter that is smaller than the diameter of the inflator sidewall, the tapered portion of the inflator sidewall extending through the airbag inflator mounting hole in the canister first endwall and engaging the inner edge of the canister first endwall in a gas-tight manner, the plurality of resilient fingers butting against the inflator flange securing the first end of the airbag inflator, a second end of the airbag inflator secured to the canister second endwall securing the airbag inflator in tension between the canister endwalls;

a diffuser shelf defining at least one gas diffusing opening and secured within the reaction canister between the open top and the airbag inflator; and a folded airbag cushion mounted within the reaction canister above the diffuser shelf, the folded airbag cushion having an open mouth positioned over the at least one gas diffusing opening defined by the diffuser shelf.

8. The airbag module of claim 7 wherein the canister first and second endwalls are unitary with the reaction canister.

9. The airbag module of claim 8 wherein the canister second endwall has an inner marginal edge defining a generally circular airbag inflator receiving hole, the airbag inflator extending through the airbag inflator receiving hole and the second end of the airbag inflator having a flat head extending radially outwardly from the airbag inflator and engaging the inner marginal edge of the canister second endwall in a substantially gas-tight manner.

10. The airbag module claim 9 wherein the reaction canister is a deep drawn reaction canister.

11. The airbag module of claim 7 wherein the reaction canister comprises a trough-shaped body defining two opposed open ends, the canister second endwall comprises a canister second endplate secured to the trough-shaped canister body closing one of the two opposed open ends and the canister first endwall comprises a canister first endplate secured to the trough-shaped canister body closing the other of the two opposed open ends.

12. The airbag module of claim 11 wherein the second end of the airbag inflator and the canister second endwall are welded together.

13. The airbag module of claim 11 wherein the canister second endplate has an inner marginal edge defining a generally circular airbag inflator receiving hole, the airbag inflator extending through the airbag inflator receiving hole and the second end of the airbag inflator having a flat head extending radially outwardly from the airbag inflator and engaging the inner marginal edge of the canister second endplate in a substantially gas-tight manner.

14. The airbag module of claim 11 wherein the trough-shaped body of the reaction canister is an extruded trough-shaped body.

15. The airbag module of claim 7 further including an airbag module cover closing the open top of the reaction canister.

* * * * *